July 16, 1957     H. ABRAMSON     2,799,092
INSTRUMENT FOR MEASURING HOLES
Filed June 12, 1952
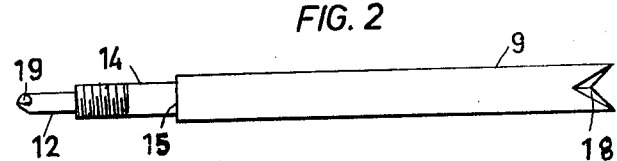
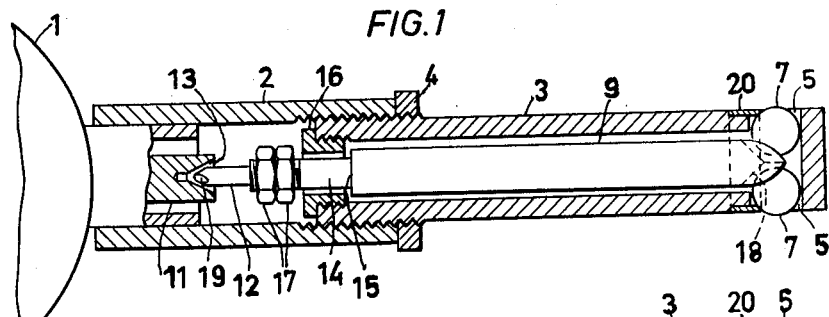
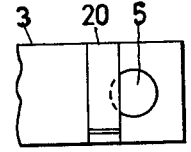
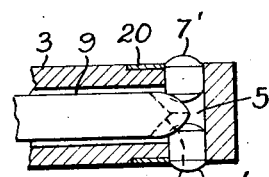
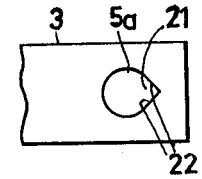
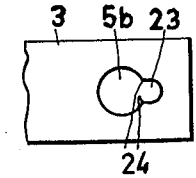

United States Patent Office 2,799,092
Patented July 16, 1957

2,799,092

INSTRUMENT FOR MEASURING HOLES

Hugo Abramson, Eskilstuna, Sweden, assignor to Aktiebolaget C. E. Johansson, Eskilstuna, Sweden, a joint-stock company of Sweden Application June 12, 1956, Serial No. 590,883

Claims priority, application Sweden June 13, 1955

6 Claims. (Cl. 33—178)

Instruments for measuring holes are previously proposed which are provided with a hollow member or sleeve having at one end radial holes which form guides for measuring members in the form of spherical balls, or in the form of small rods, said measuring members being adapted to be actuated in an outward direction by a measuring rod or plunger located and movable axially in the hollow member or sleeve and having at one end a conical portion acting between the said measuring members, the other end of said plunger being connected to a movable member of an indicator, such as a dial gauge, connected to the said sleeve and to which the axial movement of the measuring plunger is transmitted. When the measuring plunger is displaced towards the measuring members, its conical portion forces the measuring members outwards in their guides so that the measuring members come in contact with the wall of the hole to be measured, and the movement thus performed by the measuring plunger is transmitted to and may be read off on the indicator or dial gauge, which indicates the dimension of the hole. In prior instruments of this kind it is usual to guide the conical portion of the measuring plunger in such manner that it is only capable of performing movement in the axial direction but not in the transverse direction of the instrument, consequently, the measuring members can only be displaced equally far beyond the hollow member or sleeve. This entails the disadvantage that the measuring of the dimension of the hole can become incorrect if the said hollow member or sleeve of the instrument is not inserted quite centrally in the hole. In order to obviate this disadvantage it has been proposed to construct the measuring instrument in such manner as to provide a clearance or play between the hollow member or sleeve and the portion of the measuring plunger located within said sleeve, such that the measuring plunger is unprevented from moving in the transverse direction from its normal axial position, so that the conical portion of the measuring plunger can retain contact with and follow the measuring members during their movements, even though they may be displaced unequally far beyond the said sleeve. This construction provides the advantage that even if the instrument is inserted in the hole to be measured in such manner that the end of the instrument at which the measuring members are located, and which is pushed farthest into the hole, is out of center relatively to the hole, still, when during the measuring operation the conical end of the measuring plunger is moved between the measuring members, said end of the plunger will always retain contact with said members even though one or more of the measuring members are moved farther out of the sleeve than the other, in order to make contact with the wall of the hole. It is, of course, a condition, as will be easily understood, that the measuring instrument is provided with three measuring members, at least, in order that the conical portion of the measuring plunger which cooperates with said measuring members, and which is unprevented from moving in the lateral direction, shall always retain contact with the measuring members.

There are cases, however, when it is not satisfactory to determine the dimension of a hole by three-point or multi-point measurements, and it is desirable to obtain a direct measure of the diameter of the hole at different points along the circumference of the hole. The present invention is concerned with a further development of the measuring instrument above described with a view to adapt it to two-point measurements. The device according to the invention is characterized by the hollow member or sleeve being provided with two coaxial holes, the common axis of which forms right angles to and intersects the axis of the sleeve, each of said holes constituting a guide for a measuring member, and by the end portion of the movable measuring plunger that projects between and engages said measuring members, being provided with two grooves having an angular cross section and located diametrically opposite one another and at an angle to the measuring plunger, each of said grooves engaging one of said two measuring members. With this arrangement the measuring plunger will always maintain contact with the measuring members even if, during use of the instrument, one of the measuring members is moved farther out of the sleeve than the other measuring member in order to make contact with the wall of the hole. As in the case of the construction of the measuring instrument previously proposed, as above mentioned, it is also suitable, when carrying out the present invention, to construct the measuring instrument in such manner that the measuring plunger is supported and guided by the measuring members at one end only, and at its other end by that part of the indicator or dial gauge with which this end of the measuring plunger cooperates and to which it is connected.

In the accompanying drawing, Fig. 1 shows by way of example a longitudinal section of a constructional form of a measuring instrument according to this invention, and Fig. 2 shows the measuring plunger, as viewed from above in Fig. 1. Fig 3 shows a portion of one end of the measuring instrument, as viewed from above in Fig. 1. Figs. 4 and 5 show, in a manner similar to Fig. 3, two modified constructional forms of the holes for the measuring members. Fig. 6 shows a longitudinal section similar to Fig. 1 of a portion of one end of a further constructional form of a measuring instrument according to the invention.

The measuring instrument illustrated in Fig. 1 comprises an indicator or dial gauge 1, a portion of which only is shown in the drawing, and which is attached to one end of a sleeve-shaped body 2. Threaded into the opposite screw-threaded end of said body is one end of a hollow member or sleeve 3 having corresponding screw threads, so that said sleeve 3 can be adjusted in its longitudinal direction relatively to the body 2, and may then be secured in adjusted position by means of a lock nut 4. The other end of said sleeve 3 is provided with two coaxial holes 5 the common axis of which is perpendicular to and intersects the axis of the sleeve. Each of said two holes 5 constitutes a guide for a measuring member. In the constructional form illustrated, the two measuring members consist of balls 7. When the instrument is being used the said two balls 7 are to be forced outwards in the said holes 5 to contact with the inner surface of the hole to be measured. Such outward movement of the balls 7 is produced by the end directed towards the balls 7 of a measuring plunger 9 which is positioned in the sleeve 3 coaxially with the same, and which is displaceable longitudinally in said sleeve 3. Between the inner wall of the sleeve and the measuring plunger 9 there is such play or clearance that the measuring plunger is free to move, within certain limits, in the transverse direction relatively to the sleeve. At its end directed towards the balls 7 the measuring plunger 9 is provided with two grooves 18 which have an angular cross section and are located diametrically opposite one another and at an angle to the measuring plunger. Each of said grooves is in contact with one of the balls 7. At its inner or opposite end the measuring plunger 9 is shaped as a stud 12 which is provided with an approximately semi-spherical rounded end which is seated in a preferably conical recess 13 in the opposite end of a movable part or "feeler" 11 of the indicator or dial gauge 1. The said approximately semi-spherical end of the stud 12 is provided with three bevel surfaces 19 which are positioned at an angular distance of about 120° from one another, but do not contact or intersect one another, so that there are portions of the spherical surface remaining between the bevel surfaces. The contact between the conical recess 13 in the feeler 11 and the rounded end of the stud 12 will thus occur along three portions, lying between the bevel surfaces 19, of a circle on the semi-spherical surface of the stud 12, which results in the measuring plunger obtaining a precise bearing support in the conical recess, while the measuring plunger 9 is capable of swinging movement about the said end of the stud 12 as a fulcrum.

Normally, the measuring plunger 9 occupies an axial position in the sleeve 3. However, if the instrument is not pushed into the hole to be measured in such manner that the sleeve 3 occupies an exactly central position in the hole, then, when the measuring plunger is moved in a direction towards the balls 7, it will, of course, happen that the balls are forced unequally far out from the axis of the sleeve 3 in order that the balls shall come in contact with the interior surface of the hole being measured, and for this purpose the end of the measuring plunger which carries the grooves 18 must, of course, move away from its axial position in the sleeve 3. This movement is rendered possible by the measuring plunger being capable of swinging about the semi-spherical end of the stud 12 as a fulcrum, as above explained, and by the clearance between the measuring plunger and the inner wall of the sleeve 3 allowing the measuring rod to move in the transverse direction. Therefore, the outer end of the measuring plunger which carries the grooves 18, can retain engagement with the balls 7 during the outward movement of the latter, even though the balls move unequally far outwards. Provided around the sleeve 3 adjacent the holes 5 is a slotted resilient ring 20 which extends so far over the holes 5 that it prevents the balls 7 from dropping out of the holes, but, due to its spring action, allows the balls to move at least as far beyond the ends of the holes as is required by the range of measurement of the instrument.

The measuring plunger 9 is also provided with a portion 14 having a somewhat reduced diameter, thus forming a shoulder 15 on the plunger. The said portion 14 is surrounded by a screw 16 having a bore and which is screwed into the inner end of the sleeve 3. The width of the bore of said screw is sufficient to allow the measuring plunger freely to move in the transverse direction in said bore. The screw 16 forms an abutment for the shoulder 15 on the plunger 9 and thus restricts movement of the plunger in the direction to the left in Fig. 1. Screwed on the inner screw-threaded end of the portion 14 are two nuts 17 which serve as an adjustable stop which, when the instrument is not used, prevents the measuring plunger 9 from moving so far outwards, that is, in the direction to the right in the drawing, that it damages the balls 7.

In the constructional form above described the holes 5, which constitute guides for the balls 7, are cylindrical. The holes may also be made of such shape, however, that the balls move in a groove in each hole. Fig. 4 shows a construction of this kind in which the hole 5a is provided with a groove 21 which has an angular cross section, the surfaces 22 of said groove forming tangential planes to the surface of the groove which is otherwise cylindrical. In this case, the balls will rest against the said two surfaces 22 when they move in the holes. In the constructional form according to Fig. 5 there is a flute 23 along the hole 5b with which it forms two edges 24 on which the ball rolls when it moves in the hole. According to each of these two constructions, therefore, each ball will rest against two points, and therefore, the balls will move entirely without play.

The invention is not restricted to the constructional forms above described and illustrated in the drawing, the details of which may be varied within the scope of the invention. For instance, instead of using balls as measuring members, it is possible to use small rods, preferably cylindrical, and which are rounded, preferably spherically, at their outer ends, and which, suitably, may also be rounded at their inner ends.

An instrument having measuring members consisting of such rods is illustrated in Fig. 6, which shows the end of the instrument in longitudinal section, and in which the same reference numerals as in Fig. 1 are used to denote similar parts. The hollow member or sleeve 3 and the measuring plunger 9 movable therein are the same as according to Fig. 1, and the end of the sleeve 3 is provided with two coaxial holes 5 the common axis of which is perpendicular to and intersects the axis of the sleeve. The measuring plunger 9 is provided with two grooves 18 as above described in connection with Fig. 1. The measuring members consist in this case of two small rods 7' which are slidably movable in the said holes 5. As shown in Fig. 6, said rods 7' are cylindrical, and they are rounded at their outer ends and also at their inner ends which are in contact with the grooves 18 at the end of the measuring plunger 9. A slotted resilient ring 20 provided around the sleeve 3 serves to prevent the rods 7' from dropping out of the holes 5, as in the construction shown in Fig. 1.

I claim:

1. An instrument for measuring holes of the character described, comprising in combination a sleeve, said sleeve having at one end two coaxial holes the common axis of which forms a right angle with and intersects the axis of said sleeve, a measuring member in each of said holes guided therein to move in the axial direction of the hole, an indicator device connected to the other end of said sleeve and having a movable part, a measuring plunger displaceable axially in said sleeve, and means connecting one end of said measuring plunger to the movable part of said indicator device, said measuring plunger having at its other end two grooves of an angular cross section located diametrically opposite one another and at an angle to the longitudinal axis of said plunger, each of said grooves cooperating with one of said measuring members to produce outward movement of said members in said holes in said sleeve upon movement of said plunger in a direction towards said measuring members.

2. An instrument for measuring holes of the character described, comprising in combination a sleeve, said sleeve having at one end two coaxial holes the common axis of which forms a right angle with and intersects the axis of said sleeve, a measuring member in each of said holes guided therein to move in the axial direction of the hole, an indicator device connected to the other end of said sleeve and having a movable part, a measuring plunger displaceable axially in said sleeve, said measuring plunger having a less width than the inside width of said sleeve to form a clearance between said sleeve and said plunger to allow said plunger to move relatively to the sleeve in the transverse direction of the latter, and means connecting one end of said measuring plunger to the movable part of said indicator device, said measuring plunger having at its other end two grooves of an angular cross section located diametrically opposite one another and at an angle to the longitudinal axis of said plunger, each of said grooves cooperating with one of said measuring members to produce outward movement of said members in said holes in said sleeve upon movement of said plunger in a direction towards said measuring members.

3. An instrument for measuring holes of the character described, comprising in combination a sleeve, said sleeve having at one end two coaxial holes the common axis of which forms a right angle with and intersects the axis of said sleeve, a measuring member consisting of a spherical ball in each of said holes guided therein to move in the axial direction of the hole, each of said holes having such cross sectional shape that each ball bears against two points in the respective hole during its movement in the hole, an indicator device connected to the other end of said sleeve and having a movable part, a measuring plunger displaceable axially in said sleeve, said measuring plunger having a less width than the inside width of said sleeve to form a clearance between said sleeve and said plunger to allow said plunger to move relatively to the sleeve in the transverse direction of the latter, and means connecting one end of said measuring plunger to the movable part of said indicator device, said measuring plunger having at its other end two grooves of an angular cross section located diametrically opposite one another and at an angle to the longitudinal axis of said plunger, each of said grooves cooperating with one of said measuring members to produce outward movement of said members in said holes in said sleeve upon movement of said plunger in a direction towards said measuring members.

4. An instrument for measuring holes as defined in claim 2, in which each of the two coaxial holes in the sleeve has a portion consisting of a groove of angular cross section, the surfaces of said groove forming tangential planes to the otherwise cylindrical surface of the hole.

5. An instrument for measuring holes as defined in claim 2, in which each of the two coaxial holes in the sleeve has a portion shaped as a flute along the hole and forming with the hole two edges against which the measuring member rests during its movement in the hole.

6. An instrument for measuring holes of the character described, comprising in combintion a sleeve, said sleeve having at one end two coaxial holes the common axis of which forms a right angle with and intersects the axis of said sleeve, a measuring member in each of said holes guided therein to move in the axial direction of the hole, an indicator device connected to the other end of said sleeve and having a movable part provided with a conical recess at its end, a measuring plunger displaceable axially in said sleeve, said measuring plunger having a less width than the inside width of said sleeve to form a clearance between said sleeve and said plunger to allow said plunger to move relatively to the sleeve in the transverse direction of the latter, said measuring plunger having at one end a stud having a spherically rounded end engaging said conical recess in said movable part of said indicator, said spherically rounded end of said pin having bevel surfaces so arranged that portions of said spherical surface remaining between said bevel surfaces form bearing surfaces for said pin against the surface of said conical recess in said movable part of said indicator, and said measuring plunger having at its other end two grooves of an angular cross section located diametrically opposite one another and at an angle to the longitudinal axis of said plunger, each of said grooves cooperating with one of said measuring members to produce outward movement of said members in said holes in said sleeve upon movement of said plunger in a direction towards said measuring members.

No references cited.